United States Patent [19]
Townsend

[11] Patent Number: 5,675,648
[45] Date of Patent: Oct. 7, 1997

[54] SYSTEM AND METHOD FOR KEY DISTRIBUTION USING QUANTUM CRYPTOGRAPHY

[75] Inventor: Paul David Townsend, Soffolk, United Kingdom

[73] Assignee: British Telecommunications public limited company, London, England

[21] Appl. No.: 464,710

[22] PCT Filed: Dec. 23, 1993

[86] PCT No.: PCT/GB93/02637

§ 371 Date: Aug. 15, 1995

§ 102(e) Date: Aug. 15, 1995

[87] PCT Pub. No.: WO94/15422

PCT Pub. Date: Jul. 7, 1994

[30] Foreign Application Priority Data

Dec. 24, 1992 [GB] United Kingdom ............... 9226995
Sep. 9, 1993 [EP] European Pat. Off. ............. 93307120
Sep. 9, 1993 [EP] European Pat. Off. ............. 93307121

[51] Int. Cl.⁶ ............... H04L 9/00; H04B 10/00; H04J 14/00
[52] U.S. Cl. ............... 380/21; 359/112; 359/118; 380/44; 380/59
[58] Field of Search ............... 380/21, 44, 59; 359/112, 118

[56] References Cited

U.S. PATENT DOCUMENTS

| | | | |
|---|---|---|---|
| 4,965,856 | 10/1990 | Swanic | 455/617 |
| 5,243,649 | 9/1993 | Franson | 380/9 |
| 5,307,410 | 4/1994 | Bennett | 380/21 |
| 5,339,182 | 8/1994 | Kimble et al. | 359/112 |
| 5,418,905 | 5/1995 | Rarity et al. | 359/158 |
| 5,515,438 | 5/1996 | Bennett et al. | 380/21 |

OTHER PUBLICATIONS

C. H. Bennett; Physical Rev. Let.; vol. 68, No. 21, 25 May '92, pp. 3121–3124.

IBM Tech. Discl. Bul.; vol. 26, No. 8, Jan. 1984, pp. 4363–4366.

IBM Tech. Discl. Bul.; vol. 28, No. 7, Dec. 1985, pp. 3153–3163.

*Primary Examiner*—Stephen C. Buczinski
*Attorney, Agent, or Firm*—Nixon & Vanderhye P.C.

[57] ABSTRACT

A method of communication uses quantum cryptography to encode and decode a signal. A key is distributed on a quantum channel, and information subsequent communicated between the transmitter and receiver on a public channel to determine whether the key has been intercepted. A common transmission medium is used for the quantum channel and public channel. A calibration signal is transmitted over the public channel on the common transmission medium to calibrate the system for the subsequent transmisison of a key on the quantum channel. The trasmission medium may be an optical fibre and the transmitter may switch between a single-photon output and a multiple-photon output to provide quantum channel and public channel respectively.

18 Claims, 5 Drawing Sheets

SYSTEM AND METHOD FOR KEY DISTRIBUTION USING QUANTUM CRYPTOGRAPHY

BACKGROUND OF THE INVENTION

1. Field of the Invention

The present invention relates to a system for communicating encrypted data. In particular, it relates to the technique known as quantum cryptography.

2. Related Art

In quantum cryptography, data is encoded at the transmitter and decoded at the receiver using some specified algorithm which is assumed to be freely available to all users of the system, whether authorised or otherwise. The security of the system depends upon the key to the algorithm being available only to the authorised users. To this end, the key is distributed over a secure quantum channel. The transmitter and receiver then communicate over a separate channel, known as the public channel, to compare the transmitted and received data. The presence of any eavesdropper intercepting the transmitted key results in a change in the statistics of the received data, which can be detected. Accordingly, in the absence of any such change in the statistics of the data, the key is known to be secure.

In general, a communication system using quantum cryptography includes the steps of:

(a) randomly selecting one of a plurality of coding alphabets corresponding to different, non-commuting quantum mechanical operators and encoding a signal for transmission on the quantum channel using the selected operator;

(b) randomly selecting one of the different quantum mechanical operators and using that operator in detecting the signal transmitted in step (a);

(c) repeating steps (a) and (b) for each of a multiplicity of subsequent signals;

(d) communicating between the transmitter and the receiver independently of the encryption alphabets to determine for which of the transmitted signals common operators were selected for transmitting and detecting;

(e) comparing the signals transmitted and detected in steps (a) and (b) to detect any discrepancy resulting from the presence of an eavesdropper; and, (f) in the event that in step (e) no eavesdropper is detected, using at least some of the data transmitted in steps (a) and (b) as a key for encryption/decryption of subsequent transmissions.

SUMMARY OF THE INVENTION

According to the present invention, a method of communication using quantum cryptography is characterised in that a quantum channel and public channel are transmitted over a common transmission medium, and in that a calibration signal is transmitted over the public channel to calibrate the system for the transmission of a key on the quantum channel.

Hitherto, different transmission media have generally been used for the public channel and the quantum channel. The quantum channel has typically been carried over an optical fibre link, while for the public channel a standard telephony link has typically been used. The present invention by contrast achieves significant advantages by both using a common transmission medium and using transmissions over the public channel to calibrate the system prior to subsequent transmissions over the quantum channel. The calibration step can be used, for example, to counter the effect of any shifts in polarization, phase or timing across the transmission medium from the transmitter to the receiver. This makes it possible to maintain the quantum channel effectively over far greater distances than would otherwise be possible.

Preferably the step of calibrating the system includes comparing the phase and/or polarization of a signal communicated over the public channel and received at the transmitter with predetermined values of phase and/or polarization, and controlling phase or polarization compensation means connected in line with the transmission medium so as to produce a predetermined relationship between the phase or polarization of the transmitter and receiver.

The calibration step preferably includes transmitting a clock from the transmitter to the receiver on the public channel to provide timing information for the subsequent decoding of a key transmitted on the quantum channel.

Preferably the transmission system comprises an optical fibre link, and the public channel is encoded on a multiple-photon optical signal, and the quantum channel is encoded on a single-photon optical signal.

Preferably separate source outputs are used for the multiple photons and for the single photons and the transmitter switches between the different outputs. Preferably the single-photon and multiple photon outputs are derived from a common source.

According to a second aspect of the present invention there is provided a method of communication using quantum cryptography characterised in that a quantum channel and a public channel are transmitted over a common transmission medium, and in that a clock signal is transmitted over the public channel from a transmitter to a receiver to provide timing information for the subsequent decoding of a key transmitted on the quantum channel.

The present invention also encompasses communications systems adapted for use by methods according to the first or second aspects of the present invention.

DESCRIPTION OF THE DRAWINGS

Embodiments of a system in accordance with the present invention will now be described in further detail by way of example only with reference to the accompany drawings, in which.

DETAILED DESCRIPTION OF EXEMPLARY EMBODIMENT

A communication system (e.g., see FIG. 4) comprises a transmitter 1, a receiver 2, and a transmission medium 3 linking the transmitter to the receiver. In the present example, the transmission medium 3 is an optical transmission fibre.

Figure 4:
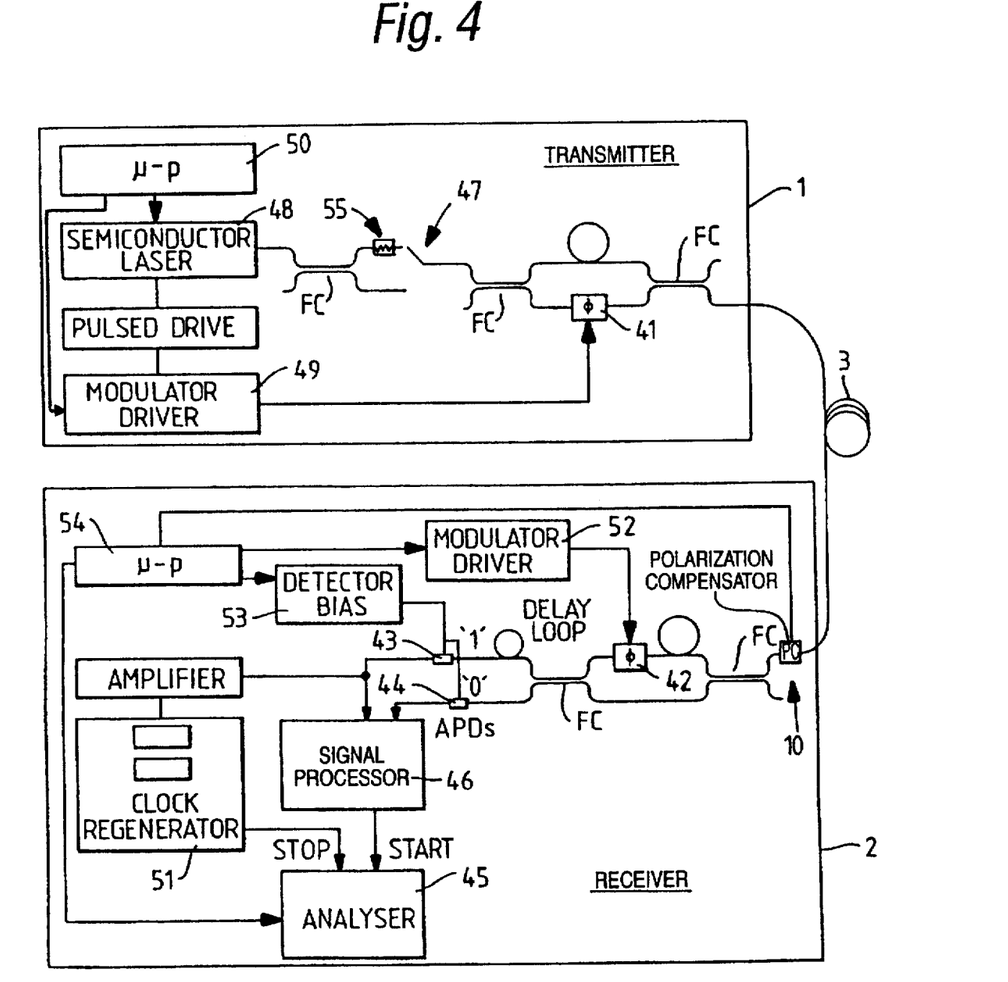
FIG. 4 is a diagram showing a fibre-based public/quantum channel communication system.

As shown in FIG. 4, the transmitter 1 includes a pulsed semiconductor laser 48 which may be, e.g., a DFB laser. One example of an appropriate device is an Hitachi series HL1361 DFB laser diode operating at 5 mW optical power at 1290–1330 nm. In use, the optical signal from the laser is modulated with encrypted data. The signal is then output onto the transmission fibre 3 and subsequently detected at the receiver 2.

In the present example, the data is encrypted using the Bennett-Brassard protocol. This scheme is described in detail in C. H. Bennett, G. Brassard, S. Breidbart and S. Wiesner, in "Advances in Cryptology: Proceedings of Crypto '82 ", (Plenum, New York, 1983); C. H. Bennett and Brassard, IBM Technical Disclosure Bulletin, 28 3153 '1985 ). Specifically, this example uses Bennett's interferometric version of the protocol, as described in C. H. Bennett, Phys. Review Lett., 68 3121 (1992).

Figure 1:
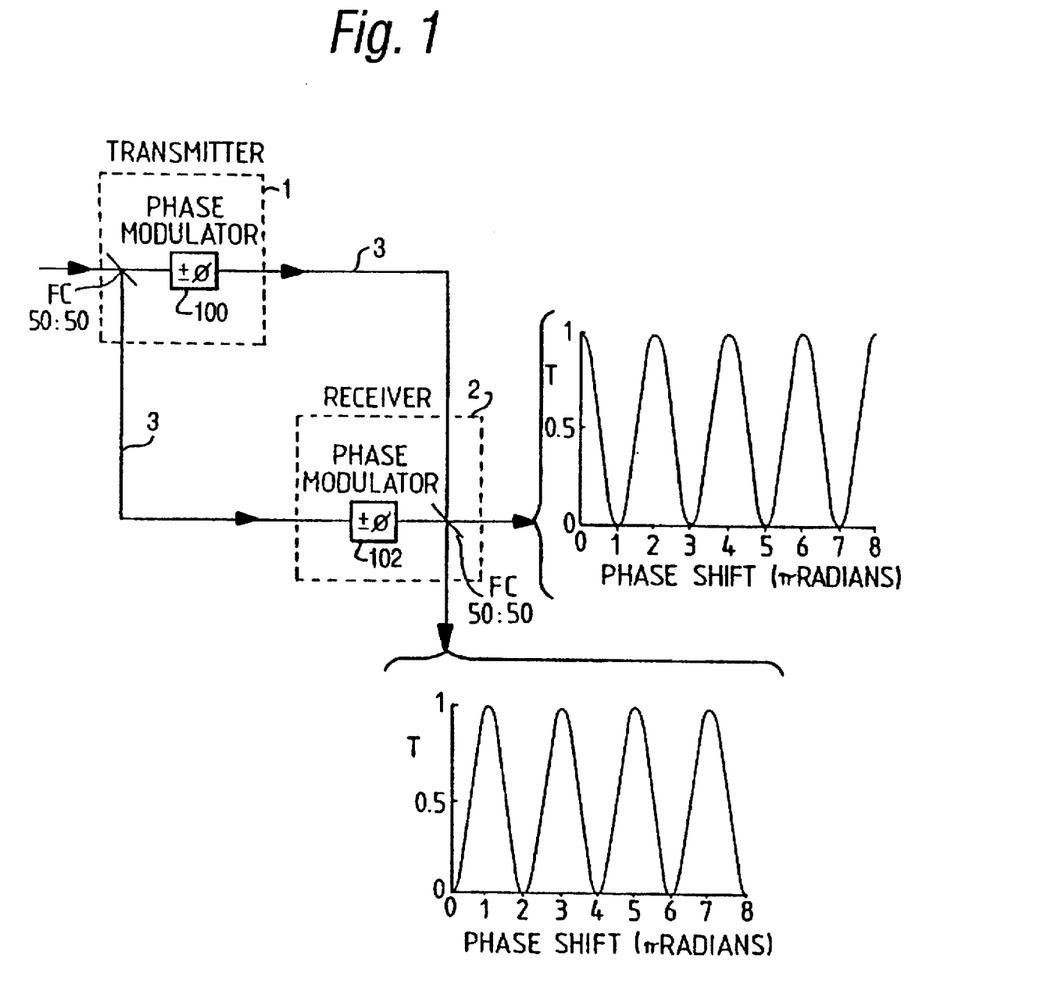
FIG. 1 is a diagram showing schematically a single-photon Mach-Zehnder interferometer for use in an embodiment of the present example, with the photon transmission probability, T, of the two output arms shown as a function of the relative phase-shift set by the phase modulators in the transmitter and receiver.

The quantum channel is based upon a single photon Mach-Zehnder interferometer, the generic form of which is shown in FIG. 1. In the transmitter, individual photons pass through a phase modulator 100 which is randomly switched between the different encoding alphabets corresponding to different integer phase shifts (e.g. 0 and $\pi$ radians) or to different half-integer phase shifts (e.g. $\pi/2$ and $3\pi/2$ radians), for example. A complementary structure is used in the receiver, with the photons again passing through a phase modulator 102 which is randomly switched to decode either integer (i.e. phase set to 0 radians) or half integer phase shifts (i.e. phase set to $\pi/2$ radians). It can be seen from the photon transmission probabilities shown in FIG. 1 that if the total phase shift $\Delta\phi$ (that is the transmitter phase shift minus the receiver phase shift) is an integer multiple of $\pi$ radians the photon will behave deterministically, and will be detected at one or the other of the interferometer output ports depending on the value $\Delta\phi$. The actual output port at which the photon is registered determines whether the key bit is interpreted as a "1" or a "0". Conversely, for cases where the receiver and transmitter chose different types of phase shift, such that the total phase shift is e.g. $\pi/2$ or $3\pi/2$, the photon will behave probabilistically at the final beamsplitter with a 50% chance of exiting from either one of the interferometer output ports. This effect of the quantum uncertainty principle is the basis of the security of the system, since any eavesdropper will be forced to make random choices of which measurement type to use. This procedure will inevitably lead to some incorrect choices which in turn lead the eavesdropper to sometimes send on the wrong type of bit to the receiver, thus causing a detectable error rate. After completion of the quantum communication, the receiver and transmitter test for the presence of an eavesdropper by using the public channel to compare which photons were encoded and decoded using the same type of phase shift, but not the results of the individual measurements (i.e. whether a 0 or a 1 was obtained). The procedure is completed by comparing the actual measured bits for a random subset of this data in order to test for any eavesdropper-induced errors. If none are detected, the legitimate users of the channel can be sure that the remainder of the data is secure, and can safely be used as the key for ensuing encrypted communications. In general for many practical systems the error rate in the raw key will be non-zero even in the absence of an eavesdropper. This may be due to system imperfections such as decoder noise or frequency-dependent modulator response for example. In this case, the transmitter and receiver communicate using the public channel in order to perform the additional steps of error correction and privacy amplification as described in C. H. Bennett et al., J. Cryptology 5, 3 (1992).

Figure 2:
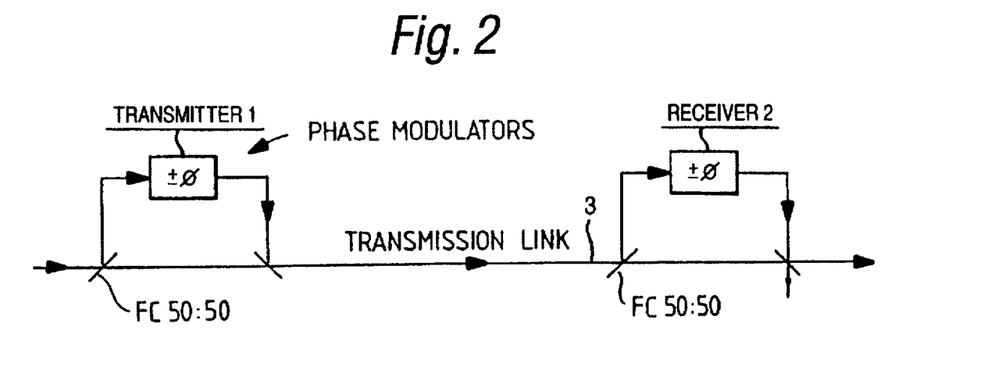
FIG. 2 shows the interferometer of FIG. 1 modified for time-division.

An appropriate generalisation of this scheme to the case of a single transmission path is shown in FIG. 2. Here, the different spatial paths available to the photon in the standard Mach-Zehnder are combined in a single path but are now distinguishable by means of time slot division. For example, the input to interferometer now consists of a stream of pulses which is split into two by the first beamsplitter in the transmitter.

Figure 3:
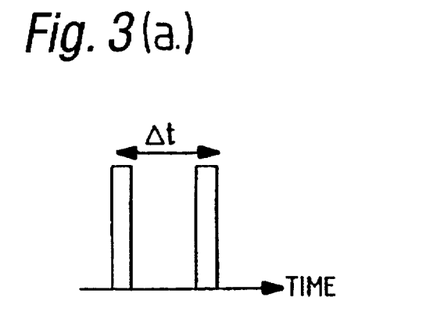
FIGS. 3a and 3b are timing diagrams for the interferometer of FIG. 2.

These two pulse streams traverse paths of unequal length and are thus interleaved at the second beamsplitter with a time delay which is set by the path length difference. Hence, as shown in FIG. 3a, the transmission link carries a stream of pulse pairs separated by a time delay $\Delta t$. In the receiver these pulse pairs are again split into two, and one half undergoes an identical delay to that in the transmitter. Hence, the inputs to the final beamsplitter are as shown in FIG. 3b and the interference between the temporally coincident pulses can be used as the basis for the quantum key encryption. The quantum nature of the channel, and hence the security, is obtained by ensuring that the pulses in the transmission fibre contain at most one photon. If the pulses contain more than one photon an eavesdropper could perform an undetectable "beamsplitting " attack in which one or more photons are split off from each pulse leaving at least one undisturbed photon to be detected by the receiver.

In the present example, this scheme is implemented in an optical fibre-based form (FIG. 4), in which both the quantum channel and the public channel are transmitted on a transmission fibre 3 linking the transmitter 1 to the receiver. In the transmitter a pulsed semiconductor laser 48 provides the optical source. The laser 48 and a modulator driver 49 for a phase modulator 41 are controlled by a microprocessor 50. The receiver 2 has its own local control microprocessor 54 which controls a respective phase modulator 42 via a modulator driver 52. The receiver control processor also controls a detector bias supply 53 for two detectors 43,44. In both the transmitter and the receiver, where the signal path branches fused fibre 50/50 couplers (FC) are used. Suitable couplers are available commercially from SIFAM as model P2S 13AA50.

Appropriate modulators 41,42 for the data encoding and decoding are lithium niobate or semiconductor phase modulators operating at e.g. 100 MHz. Appropriate single photon detectors would be for example semiconductor avalanche photodiodes (APDs) such as those described in B. F. Levine, C. G. Bethea and J. C. Campbell, Electronics Letters, 20 596 (1984). These are biased beyond reverse breakdown and operate in the Geiger mode with passive or active quenching, as discussed in R. G. W. Brown, K. D. Ridley and J. G. Rarity; Appl. Opt. 25 4122 (1986) and Appl. Opt. 26, 2383 (1987). The key distribution protocol requires each received photon to be associated with a given clock period and also identified as a 0 or 1 depending upon which APD it is detected at. These functions are performed by a time interval analyser 45 (e.g. Hewlett-Packard 53310A). The start signals for this device are provided by the APD outputs after processing by a circuit 46 comprising amplifiers and discriminators connected in series with each output and an exclusive-OR gate connected to the discriminators (e.g.

Lecroy 612A, 821 and 622). The stop signals are provided by the clock regenerator 51 which is described below. The detection procedure is described in P. D. Townsend, J. G. Rarity and P. R. Tapster, Electronic Letters, 29,634 (1993) and 29, 1291 (1993). Silicon APDs such as the SPCM-100-PQ (GE Canada Electro Optics) can be used in the 400–106 nm wavelength range, while germanium or InGaAs devices such as the NDL5102P or NDL5500P (NEC) can be used in the 1000–1550 nm range.

Figure 5:
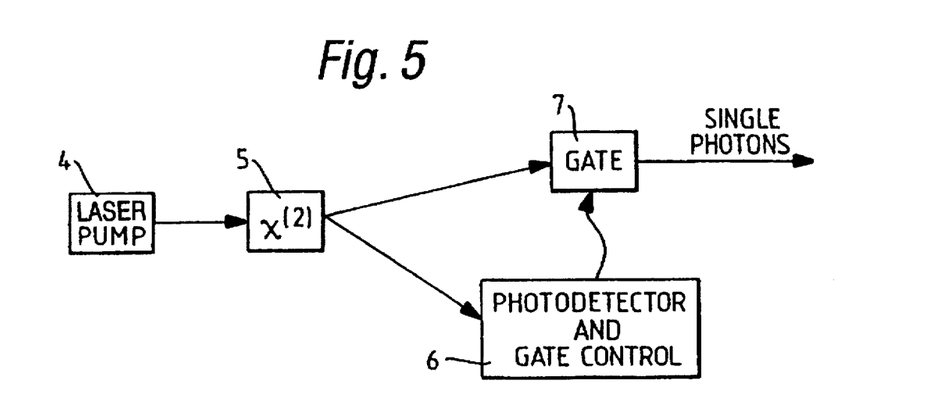
FIG. 5 shows a single-photon source.

As noted above, ideally the quantum channel uses pulses containing at most one photon. This situation is approximated by connecting an attenuator 55 in line with the laser source in order to reduce the intensity to a level such that the average number of photons per pulse, $\mu$, is about 0.1. For a Poissonian laser source with $\mu<<1$ the probability of obtaining pulses with two or more photons is approximately $\mu^2/2$ which is very small for $\mu=0.1$. Attenuation thus reduces the possibility of an undetected beamsplitting attack, however, the received bit rate is reduced by a factor of 10 compared to the case of truly singe photon pulses. Hence there exists a trade-off between security and data rate in the system. In practise, it may be desirable to use parametric downconversion to produce single photon pulses in order to optimise the received bit rate. FIG. 5 then shows an appropriate arrangement for the single photon source. A laser 4 whichmay be, e.g., a Ti:sapphire at 750 nm, is used to pump a non-linear crystal 5 such as KDP. The parametric down conversion effected by the crystal produces correlated twin beams of photons at 1.5 μm. The photons in one beam are detected by a photodetector 6 and this triggers a gate 7 which opens a shutter to let through a single photon.

As seen in FIG. 4, an alternative mechanically switched path may be provided for the output from the laser, which bypasses the attenuator or single-photon source. The switch may be, e.g., JDS-Fitel SW12. This provides the public channel at the same wavelength as the quantum channel but using bright multi-photon pulses. The large intensity of these pulses would lead to saturation and current heating effects in the single-photon detectors. In order to avoid this happening, the reverse bias on the APDs is reduced well below breakdown so that the devices operate with greatly reduced sensitivity in the standard analogue mode. Alternatively the APDs may be isolated by means of electro-mechanical optical switches, similar to that used in the transmitter, or using electro-optic switches, which route the multi-photon pulses to an additional standard detector such as a p-i-n photodiode.

Since this channel operates with many photons per pulse, it is classical in nature and is therefore open to attack by any eavesdropper. This channel provides the public channel for the encoding protocol. The transmitter and receiver communicate on this public channel to exchange information on which encoding/decoding alphabets were used for given signal pulses. On the basis of this data, the statistics of the signal received at the receiver can be analysed to determine whether the key has been received securely, or whether an eavesdropper has intercepted any part of the key.

In addition to use for this public discussion stage of the protocol, the public channel is also used to calibrate the transmission system. Over a long optical fibre link, which may be as long as say 50 km, unavoidable environmental effects on the fibre, such as temperature fluctuations, cause both the polarization and phase of the transmitted pulses to vary slowly and randomly with time. The calibration step makes it possible to correct for these variations, as described below.

Any communication between the transmitter and receiver is initialized by using the public channel to measure the output polarization from the transmission fibre 3. A polarization compensator 10 (e.g. JDS-Fitel PR2000) in the receiver 2 is then adjusted via a feedback loop in order to linearize the output polarization and match it to the preferred polarization axis of the receiver. In some cases, if the transmission fibre preserves polarization, or if the interferometer components are insensitive to polarization, this step may not be required. For the case of phase encoding, the transmitter and receiver then use the public channel to calibrate the relative phase shift in their interferometers. In order to do this, the microprocessor controllers turn off the time-varying signals from their modulator drivers. The controller in the receiver then sets the phase in the interferometer to the start position either by changing the DC offset voltage from the modulator driver or, if the modulator is AC-coupled, by means of an additional phase-shifting component connected in-line with the modulator such as a PZT-based fibre-stretcher. The phase shift is monitored by means of the APD signal level and this may be, e.g., maximised or minimised. This then completes the calibration of the system. The optical switch in the transmitter is then set to establish the quantum channel by connecting the low intensity source, and the bias supply 53 in the receiver (e.g. Keithley 230) reverse biases the APDs beyond breakdown to achieve single-photon sensitivity. The transmitter and receiver can then use relative phase modulation of the signal as the basis for secure communication. After some characteristic time, the system needs to be re-calibrated and so the calibration steps outlined above are repeated. After the key has been communicated on the quantum channel, the public channel is then used to complete the key distribution protocol. This step requires the use of an additional source at the receiver and an additional detector at the transmitter (not shown in FIG. 4) to enable two way communication. The data sent over the public channel during this discussion stage of the protocol can also be modulated by means of phase shift keying as in the case of the quantum data, using the phase modulators in the system. In practise, it may be desirable to continue the periodic calibration of the system during this stage of the protocol.

The quantum key distribution system used in the present example has a common pulsed laser source from which both the quantum and public channels sources are derived and the protocol requires that the transmitter and receiver must correlate the sent and received data for each pulse time-slot. Consequently, a system clock is required to avoid timing errors. This function can be performed by the public channel during the calibration process outlined above. During this process, the amplified output from the public channel detector is input to the clock regenerator module. This contains an electronic filter that produces an oscillating signal at the pulse repetition frequency which is used to lock a local oscillator to the optical source or master clock frequency. This local oscillator is then used to provide the timing information required by the receiver during the quantum transmission stage of the protocol. Each time the transmission system is recalibrated via the public channel, the local oscillator is re-timed so as to avoid the accumulation of any timing errors. The frequency with which re-calibration needs to be carried out is determined by the shorter of the two time constants associated with the stability of the local oscillator and the transmission channel.

Although in the example discussed above, the public and quantum channels use a single common wavelength, alternatively different wavelengths might be used. The different channels can then be separated by means of wavelength-dependent fibre couplers and optical filters. In this case the clock and calibration information can be transmitted continuously during the quantum transmission. This removes the need for a local oscillator in the receiver and thereby removes any instability problems that might be associated with such an oscillator. Moreover, the system in its widest scope is not limited to transmission over optical fibres, but can be applied to key distribution systems operating in any region of the electro-magnetic spectrum using any appropriate transmission medium. In an alternative embodiment shown in FIG. 6, the optical fibre network used for both the quantum transmissions and the public channel is a multiple-access network. As described and claimed in our co-pending European application no. 93307120.1, the basic quantum-cryptographic protocol can be extended for use with such a network. Then in steps (a) to (c) of the transmission protocol, each encoded bit transmitted is either lost from the system or received at one only of the plurality of receivers. The transmitter outputs a sufficient number of bits, each bit being carried by one single-photon signal, for each receiver to establish an r-bit key, where r is a predetermined integer. The number of transmitted bits required is determined by the coupling ratios at each branch and the attenuation in the network. Each receiver receives a different sequence of bits, randomly determined by the paths taken by the individual single-photon pulses. Therefore, after the completion of the public discussion phase and testing to ensure that there has been no eavesdropping, in accordance with steps (e) and (f) of the protocol, each receiver has a different r-bit key known to the transmitter. This key can subsequently be used for secure communication between the transmitter and the different receivers using multi-photon signals broadcast on the network in both directions, i.e. from the receiver to the transmitter as well as from the transmitter to the receiver.

Whereas in the transmission of the quantum channel, the photons have to be treated as behaving non-classically, for the calibration process the network functions as a conventional classical multiple-access network, with the multi-photon signals being split at the different branches. Accordingly, a multi-photon calibration signal output by the transmitter can be used to calibrate simultaneously all the different receivers on the network.

Figure 6:
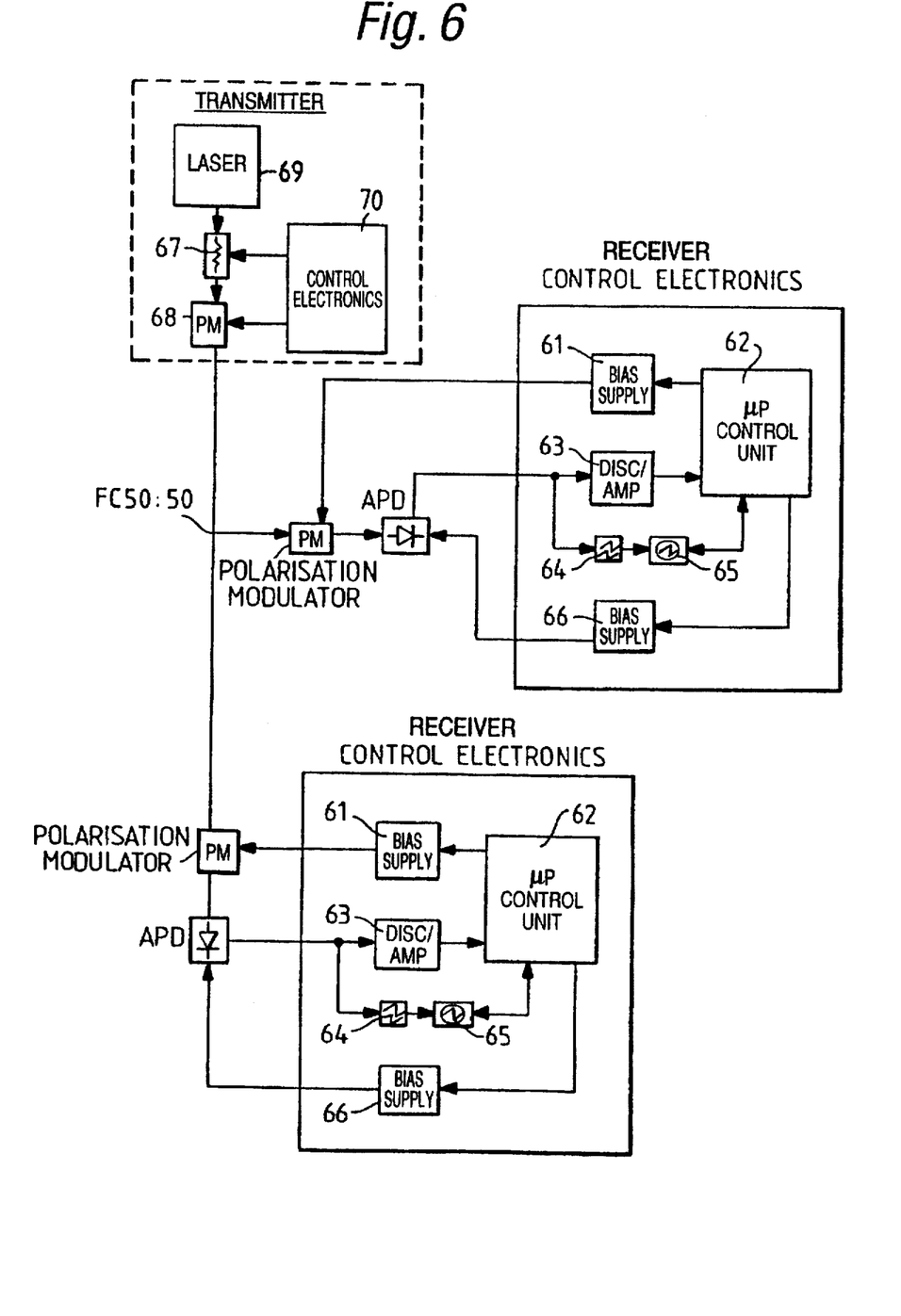
FIG. 6 shows a multi-access network embodying the present invention.

Although in the example of FIG. 6, only two receivers are shown, in practice networks employing greater numbers of receivers will often be used. The number chosen will vary according to the field of use. For a local installation on a single site, the network might comprise only ten receivers or terminals. By contrast, for a public network several tens or even a hundred or more receivers might be connected to the network and would receive quantum keys distributed from a single-server. Any one of a number of different configurations can be used for the network, including, for example, tree, bus, ring or star configured networks, or combinations thereof.

FIG. 6 shows a specific example of a broadcast network containing two receivers and a transmitter. The transmitter consists of a gain-switched semiconductor laser 69, of the type described above, an attenuator or intensity modulator 67, and a polarisation modulator 68 and control electronics 70. The single-photon detectors in the receivers may be the same devices as described in the first embodiment discussed above. Each receiver includes a microprocessor control unit 62, which receives the output of the APD via a discriminator/amplifier circuit 63. The control unit 62 also controls an electronic filter 64 and local oscillator 65, as well as the APD bias supply 66 and the polarisation modulator bias supply 61. The electronic filter 64 isolates the first harmonic of the frequency spectrum of the signal output by the APD in response to synchronising pulses received via the network. This generates a sinusoidal signal at the pulse frequency which locks the local oscillator 65. The output of the local oscillator 65 is received at the control unit 62 to provide a timing reference during quantum transmissions.

The key distribution process is initiated by the transmitter sending a stream of multi-photon timing pulses into the network. The attenuator in the transmitter is not engaged at this point. The pulses are received by both terminals. Prior to this the receivers have set the reverse bias on their detectors to be well-below breakdown so that the internal gain is low. In this mode, the APDs can detect the multi-photon timing pulses without suffering from saturation. Each APD output signal contains a frequency component at the fundamental repetition rate of the pulsed source, and this is used to clock the local oscillator in the receiver as described above.

After the synchronisation procedure, the attenuator in the transmitter is engaged so that the output pulses contain around 0.1 photons on average. In addition, the APDs in the receivers are biased beyond breakdown so that internal gain is high enough to achieve detection sensitivity at the single-photon level. Transmissions are then carried out on the quantum channel as described above.

As an alternative to, or in addition to, the use of a distinct initial timing/calibration phase, timing and calibration information may be sent concurrently with the quantum key information. This may be done, for example, by controlling the attenuator to increase the intensity of every $p_{th}$ pulse. This pulse would then contain sufficient photons to guarantee that it is detected by all the receivers on the network. After the quantum transmission is complete the receivers analyse their received data sets to identify the regularly spaced reference events. These events, possibly after multiplication by a factor of p to convert the event frequency to the pulse frequency, can then be used to identify the time-slots of the quantum channel detection events which, in contrast, occur irregularly and at much lower frequency, between the reference events. Although in general the time-averaged intensity of the pth pulses is sufficiently low to avoid saturation problems, optionally the single-photon detector may be blanked during each timing pulse slot. This may be done either by reducing the sensitivity of the detector, e.g. by reducing the reverse bias to the APD, or by means of a second switchable attenuator connected in line with the single-photon detector. Consequently, there will be a lower limit on p since ideally the single-photon detector should receive may single-photon pulses for each timing pulse. The upper limit for p is determined by the stability of the local oscillators in each receiver.

As a further alternative approach to the transmission of concurrent timing/calibration signals, the signals may be encoded on a separate wavelength from that used for the quantum channel and wavelength-sensitive components such as WDM couplers and filters used to isolate the quantum and calibration channels.

Figure 7:
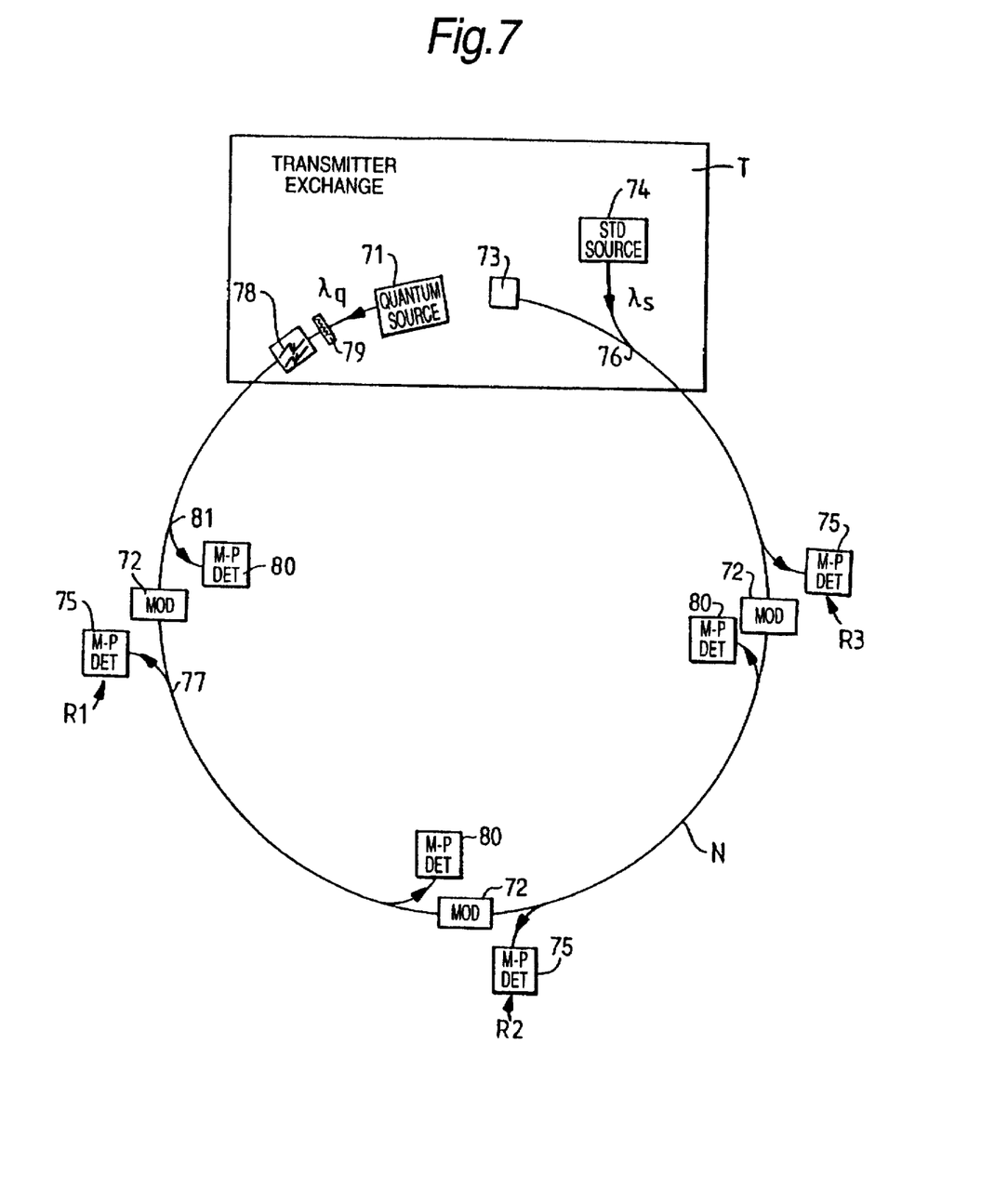
FIG. 7 shows a ring network embodying the present invention.

The calibration schemes of the present invention may also be used in networks having a loop configuration. Using such a configuration it is possible to achieve significant reductions in-cost and complexity for multiple-access key distribution. Instead of using a destructive single-photon detector in each receiver or node, a modulator is provided in each receiver or node which modulates an incoming single-photon signal and passes it on to travel back to a single-photon detector in the transmitter/exchange. As will be apparent, such a configuration then only needs one single-photon detector at the transmitter/exchange, rather than multiple single-photon detectors distributed among the different nodes. FIG. 7 shows an example of a communications system comprising a transmitter/exchange T connected to three receivers R1–R3 via a passive optical network N having a ring topology. The transmitter T includes both a quantum channel source 71 for use in establishing a key by quantum cryptography, and also a conventional intensity-modulated source for outputting multi-photon signals for the calibration phase and also for carrying conventional traffic. The quantum channel source 71 and standard source 74 operate at different wavelengths $\lambda_q$ and $\lambda_s$, respectively. The output from the quantum source 7 passes through a switchable attenuator 79 and a polariser and band-pass filter 78 tuned to the quantum channel wavelength $\lambda_q$.

Each receiver or node comprises a first multi-photon detector 75 for the signal on channel $\lambda_s$, a detector 80 for multi-photon timing signals at the quantum channel wavelength $\lambda_q$, and a modulator 72, which in the present example is a polarisation modulator. The clock detector 80 is connected to the network N by a fibre coupler 81 which provides a weak tap at $\lambda_q$. These taps have low coupling fractions (e.g. of the order 1%) in order not to introduce excessive attenuation in the quantum channels. Alternatively if a separate wavelength $\lambda_c$ is used for the calibration signals then WDM couplers which have a finite coupling fraction at $\lambda_c$ and ideally a zero-coupling fraction at $\lambda_q$ can be employed. The detector 75 for the signal wavelength is connected to the network by a WDM (wavelength division multiplexer) coupler 77. The WDM is a fibre coupler with a wavelength-dependent coupling characteristic. In the present example the WDM provides a straight-through route for the quantum channel, i.e. the coupling fraction out of the loop is small at $\lambda_q$, whilst at the signal wavelength $\lambda_s$ the coupling fraction has a much larger value $F_s$.

Although it is much preferred that the public channel should be used both for the calibration of the system and for the transmission of timing signals, alternatively, these two functions may be carried out independently. For example, in a system in which calibration is carried out using signals transmitted on the quantum channel, rather than multi-photon signals on the public channel, the public channel may still advantageously be used for the transmission of a clocking signal in the manner described above.

I claim:

1. A method of communication using quantum cryptography comprising:
   transmitting a quantum channel and a public channel over a common transmission medium, and
   transmitting a calibration signal over the public channel to calibrate the system for the transmission of a key on the quantum channel.

2. A method according to claim 1, including:
   calibrating the system by comparing the phase and/or polarization of a signal communicated over the public channel and received at the receiver with predetermined values of phase and/or polarization, and
   controlling phase or polarization compensation means connected in line with the transmission medium so as to produce a predetermined relationship between the phase and/or polarization of the transmitter and receiver.

3. A method according to claim 1 including:
   calibrating the system by transmitting a clock from the transmitter to the receiver on the public channel to provide timing information for the subsequent decoding of a key transmitted on the quantum channel.

4. A method according to claim 1 in which:
   the quantum channel and public channel are transmitted over a common optical fibre link,
   the public channel is encoded on a multiple-photon optical signal, and
   the quantum channel is encoded on a single-photon optical signal.

5. A method according to claim 4, in which:
   separate source outputs are used for the multiple photons and for the single photons and the transmitter switches between the different outputs.

6. A method according to claim 1 in which:
   the step of transmitting a calibration signal is repeated intermittently during the transmission of a key on the quantum channel.

7. A method according to claim 6, in which:
   the step of transmitting a calibration signal is repeated during a subsequent transmission of data on the public channel.

8. A method of communication using quantum cryptography comprising:
   transmitting a quantum channel and a public channel over a common transmission medium, and
   transmitting a clock signal over the public channel from a transmitter to a receiver to provide timing information for the subsequent decoding of a key transmitted on the quantum channel.

9. A method according to claim 8, in which:
   the clock signal is transmitted in an initial timing phase prior to the transmission of a key on the quantum channel.

10. A method according to claim 8, in which:
    the dock signal is transmitted concurrently with other transmissions on the quantum or public channels.

11. A communication system for use in a method of quantum cryptography comprising:
    a transmitter,
    one or more receivers
    a network linking the transmitter to the or each receiver,
    the transmitter being arranged to transmit a quantum channel and a public channel on a common transmission medium provided by the network, and
    the transmitter including means for generating a calibration signal for transmission over the common transmission medium.

12. A system according to claim 11, including:
    means responsive to the calibration signal transmitted over the common transmission medium for controlling a phase or polarisation compensation means connected in line with the transmission medium to produce a predetermined relationship between the phase and/or polarisation of signals transmitted and received on the quantum channel.

13. A system according to claim 11, in which:
    the transmitter includes a clock and outputs a clock signal as part of the said calibration signal to provide timing information for subsequent decoding of a key transmitted on the quantum channel.

14. A system according to claim 11, in which:
    the network providing the common transmission medium for the quantum channel and public channel is a optical fibre network, and
    the transmitter is arranged to generate a multiple-photon optical signal for transmissions on the public channel and a single-photon signal for transmission on the quantum channel.

15. A system according to claim 14, in which:

the transmitter includes separate source outputs for multiple-photons and single-photons at an optical switch arranged to connect one or the other of the separate source outputs to the network.

16. A communication system for use in a method of quantum cryptography comprising:

a transmitter, one or more receivers, a network linking the transmitter to the or each receiver, the transmitter being arranged to transmit a quantum channel and a public channel on a common transmission medium provided by the network, and the transmitter including a clock that outputs a clock signal on the public channel to provide timing information for subsequent decoding of a key transmitted on the quantum channel.

17. A system according to claim 11, in which:

the network is a multiple-access network.

18. A system according to claim 11, including:

a looped-back path from one or more receivers to the transmitter, the transmitter including a single-photon detector for detecting signals on the quantum channel returned via the looped-back path.

* * * * *